US008116963B2

(12) United States Patent
Plambeck

(10) Patent No.: US 8,116,963 B2
(45) Date of Patent: Feb. 14, 2012

(54) FUEL INJECTION PIN DISPLACEMENT PROFILE INTERPOLATION

(75) Inventor: Eric D. Plambeck, Ventura, CA (US)

(73) Assignee: Transonic Combustion, Inc., Camarillo, CA (US)

( * ) Notice: Subject to any disclaimer, the term of this patent is extended or adjusted under 35 U.S.C. 154(b) by 379 days.

(21) Appl. No.: 12/534,738

(22) Filed: Aug. 3, 2009

(65) Prior Publication Data

US 2011/0029217 A1 Feb. 3, 2011

(51) Int. Cl.
*F02D 41/30* (2006.01)
*G06F 19/00* (2011.01)
*F02M 51/00* (2006.01)

(52) U.S. Cl. ......... 701/104; 123/480; 123/486; 701/115

(58) Field of Classification Search .......... 701/102-106, 701/110, 114, 115; 123/478, 480, 486; 702/182; 361/152, 160
See application file for complete search history.

(56) References Cited

U.S. PATENT DOCUMENTS 5,979,404 A * 11/1999 Minowa et al. ............... 123/399
6,092,510 A * 7/2000 Przymusinski et al. ...... 123/478
6,668,795 B1 * 12/2003 Shimada ....................... 123/350
6,961,651 B2 * 11/2005 Oshima ......................... 701/104
7,255,087 B2 * 8/2007 Kanne et al. .................. 123/299
7,392,129 B2 * 6/2008 Hill et al. ...................... 701/105
7,546,826 B2 6/2009 Cheiky
7,860,638 B2 * 12/2010 Andren ......................... 701/114
2005/0005909 A1 * 1/2005 Oshima ......................... 123/446
2005/0126551 A1 6/2005 Mello et al.
2009/0255508 A1 10/2009 Cheiky
2010/0017099 A1 1/2010 Becker
2010/0126471 A1 5/2010 Cheiky
2010/0176686 A1 7/2010 Diamond
2010/0180866 A1 7/2010 Becker
2010/0194238 A1 8/2010 Frick
2010/0201290 A1 8/2010 Becker
2010/0201291 A1 8/2010 Cheiky
2010/0204901 A1 8/2010 Cheiky

OTHER PUBLICATIONS

U.S. Appl. No. 12/778,001, David E. McCann.
U.S. Appl. No. 12/817,136, Michael J. Frick.
U.S. Appl. No. 12/779,786, Michael C. Cheiky.
U.S. Appl. No. 12/755,591, David E. McCann.
U.S. Appl. No. 12/721,499, Jeffrey Bluen.

* cited by examiner

*Primary Examiner* — Willis Wolfe, Jr.
*Assistant Examiner* — Johnny Hoang
(74) *Attorney, Agent, or Firm* — David E. Heisey

(57) ABSTRACT

According to various embodiments of the invention, a map of injection pin profiles is experimentally determined at various locations spanning an engine operating plane. Injector pin profiles at points within the continuum spanned by the experimentally determined profiles are determined by interpolating between surrounding experimentally determined injector pin profiles. Various methods are used to adjust the interpolation procedure in cases where one injector pin profile has more or fewer points than the other injector pin profile.

20 Claims, 12 Drawing Sheets

FUEL INJECTION PIN DISPLACEMENT PROFILE INTERPOLATION

TECHNICAL FIELD

The present invention relates generally to internal combustion engine fuel injection, and more particularly, some embodiments relate to determination of fuel injection pin displacement profiles.

DESCRIPTION OF THE RELATED ART

By precisely injecting fuel into an internal combustion engine, the efficiency of the engine can be increased. The optimum operation of the engine is affected by how the fuel injector is opened and closed. The fuel injection is controlled by the lifting and lowering of an injector pin. The function of the pin lift with respect to the timing of the engine's piston around top dead center directly affects the operation and efficiency of an internal combustion engine. This function is an injection profile. A profile comprises a set of points; pairs of time and pin displacement values. FIG. 1 illustrates a conventional example injection profile comprising points 50, 51, 52, 53, and 54. In FIG. 1, and in the other injection profiles illustrated herein, the horizontal axis is the time axis while the vertical axis is the displacement axis. Contour 55 illustrates the injection pin displacement as a function of time, assuming that the injection pin displaces at a constant rate between injection profile points. For ease of explanation only, injector and profiles herein will be illustrated under this assumption.

The injection profile can be determined experimentally at different combinations of an engine's torque and speed, known as operating points. Since an engine can operate over a continuous range of operating points in the operating plane, the number of points to determine experimentally is infinite.

BRIEF SUMMARY OF EMBODIMENTS OF THE INVENTION

According to various embodiments of the invention, a map of injection pin profiles is experimentally determined at various locations spanning an engine operating plane. Injector pin profiles at points within the continuum spanned by the experimentally determined profiles are determined by interpolating between surrounding experimentally determined injector pin profiles. Various methods are used to adjust the interpolation procedure in cases where one injector pin profile has more or fewer points than the other injector pin profile.

According to one embodiment of the invention, a method is presented for determining an interpolated injector pin profile for a fuel injector at an engine operating point in an engine operating plane, the engine operating plane comprising operating points having speed values and torque values. In this embodiment the method comprises obtaining a first injector pin profile associated with a first operating point and comprising a first set of profile points comprising displacement values and time values; obtaining a second injector pin profile associated with a second operating point and comprising a second set of profile points, the second injector pin profile comprising at least as many profile points as the first injector pin profile; connecting a profile point of the second injector pin profile with a profile point of the first injector pin profile to form connected injector pin profiles; and using the connected injector profiles to determine an interpolated injector pin profile at an operating point between the first operating point and the second operating point.

According to another embodiment of the invention, a fuel injection system comprises a fuel injector configured to inject fuel into an internal combustion engine and comprising a pin configured to be displaced using an actuator; the actuator configured to displace the pin according to an actuator driving signal; and an engine control unit configured to generate the actuator driving signal according to an engine operating point in an engine operating plane, the engine operating plane comprising operating points having speed values and torque values; wherein the engine control unit is configured to determine the engine operating point using a firing signal and a throttle position signal; and wherein the engine control unit is further configured to generate the actuator driving signal using an interpolated injector pin profile, the interpolated injector pin profile determined using the steps of: obtaining a first injector pin profile associated with a first operating point and comprising a first set of profile points comprising displacement values and time values; obtaining a second injector pin profile associated with a second operating point and comprising a second set of profile points, the second injector pin profile comprising at least as many profile points as the first injector pin profile; connecting a profile point of the second injector pin profile with a profile point of the first injector pin profile to form connected injector pin profiles; and using the connected injector profiles to determine an interpolated injector pin profile at an operating point between the first operating point and the second operating point.

According to a further embodiment of the invention, the engine control unit is further configured to perform the step of adding profile points to the first injector pin profile such that the first injector pin profile and the second injector pin profile comprise an equal number of points; and wherein the step of forming the connected injector pin profiles comprises connecting the profile points of the first injector pin profile with the profile points of the second injector pin profile according to increasing time value.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Before describing the invention in detail, it is useful to describe an example environment with which the invention can be implemented. One such example is that of a fuel injector for use in an internal combustion engine employing direct injection. Such fuel injectors may be of the types described in U.S. Pat. No. 7,444,230, "FUEL INJECTOR HAVING ALGORITHM CONTROLLED LOOK AHEAD TIMING FOR INJECTOR-IGNITION"; U.S. patent application Ser. No. 12/237,302, "FUEL INJECTOR HAVING ALGORITHM CONTROLLED LOOK AHEAD TIMING FOR INJECTOR-IGNITION"; and U.S. patent application Ser. No. 11/692,111, "HEATED CATALYZED FUEL INJECTOR FOR INJECTION IGNITION ENGINES"; the contents of which are hereby incorporated by reference in their entirety. Additionally, such fuel injectors may employ piezoelectric actuators of the types described in U.S. Provisional Patent Application No. 61/081,326, "A PIEZO ACTUATED FUEL INJECTOR WITH CATALYTIC SECTION"; U.S. Provisional Patent Application No. 61/117,897, "DUAL SOLENOID FUEL INJECTOR WITH CATALYTIC ACTIVATOR SECTION"; U.S. Provisional Patent Application No. 61/144,274, "MULTI-ELEMENT PIEZOELECTRIC ACTUATOR DRIVER"; U.S. Provisional Patent Application No. 61/144,265, "PIEZOELECTRIC ACTUATOR FAULT RECOVERY SYSTEM AND METHOD"; U.S. Provisional Patent Application No. 61/144,260, "SERIALLY OPERATING MULTI-ELEMENT PIEZOELECTRIC ACTUATOR DRIVER"; U.S. Provisional Patent Application No. 61/144,270, "SYSTEM AND METHOD FOR DEFINING PIEZOELECTRIC ACTUATOR WAVEFORM"; U.S. Provisional Patent Application No. 61/144,254, "PIEZOELECTRIC ACTUATOR EMPLOYING SWITCH"; and U.S. Provisional Patent Application No. 61/159,044, "REVERSE OPERATING NONLINEAR SPRING."

Figure 11:
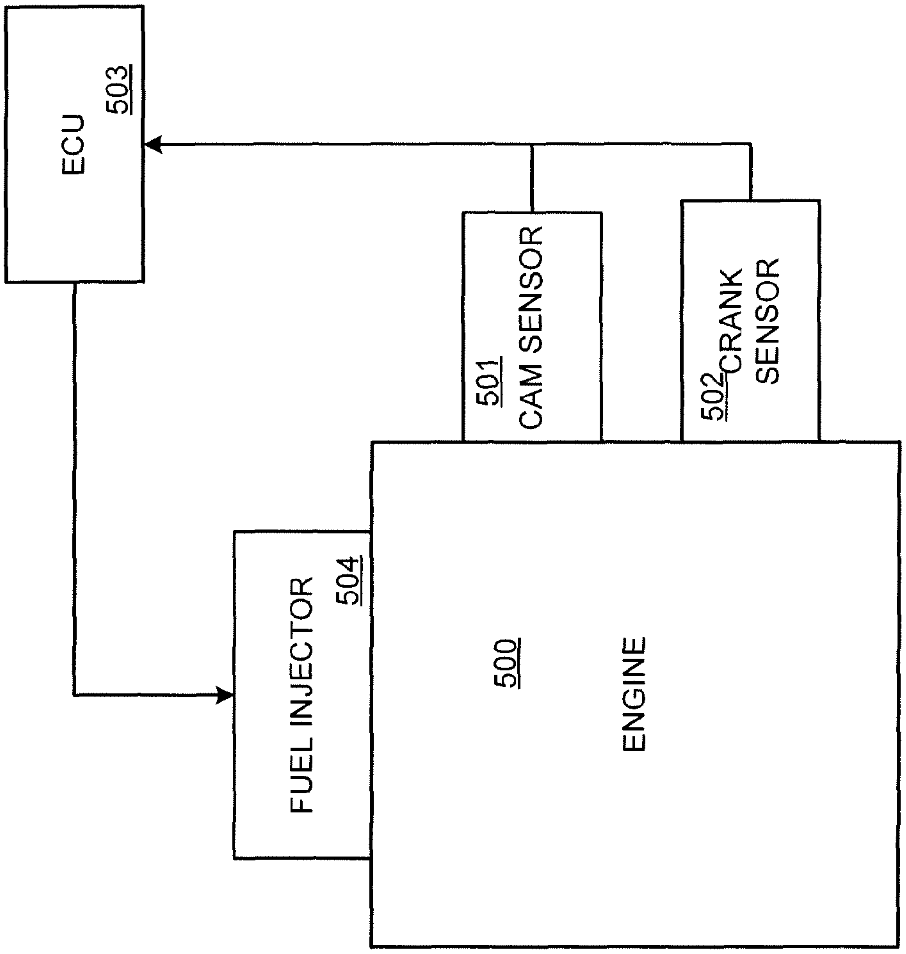
FIG. 11 illustrates an environment in which embodiments of the invention might be implemented.

FIG. 11 illustrates an example environment in which the present invention may be implemented. Engine 500 may comprise, for example, a gasoline direct injection engine, a diesel engine, or any other fuel injected internal combustion engine. Sensors such as cam censor 501 and crank sensor 502 provide engine operating data to the engine control unit (ECU) 503. The ECU 503 uses this data to determine where on the operating plane the engine is currently operating. As described herein, using this information and predetermined injection pin profiles spanning the engine operating plane, the ECU determines an injection pin profile for the engine's 500 fuel injectors at the operating point. The fuel injector 504 is in connection with the ECU 503, for example via a fuel injector driver, and is caused to inject fuel into the engine 500 according to the injection pin profile determined for the current operating point.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 1:
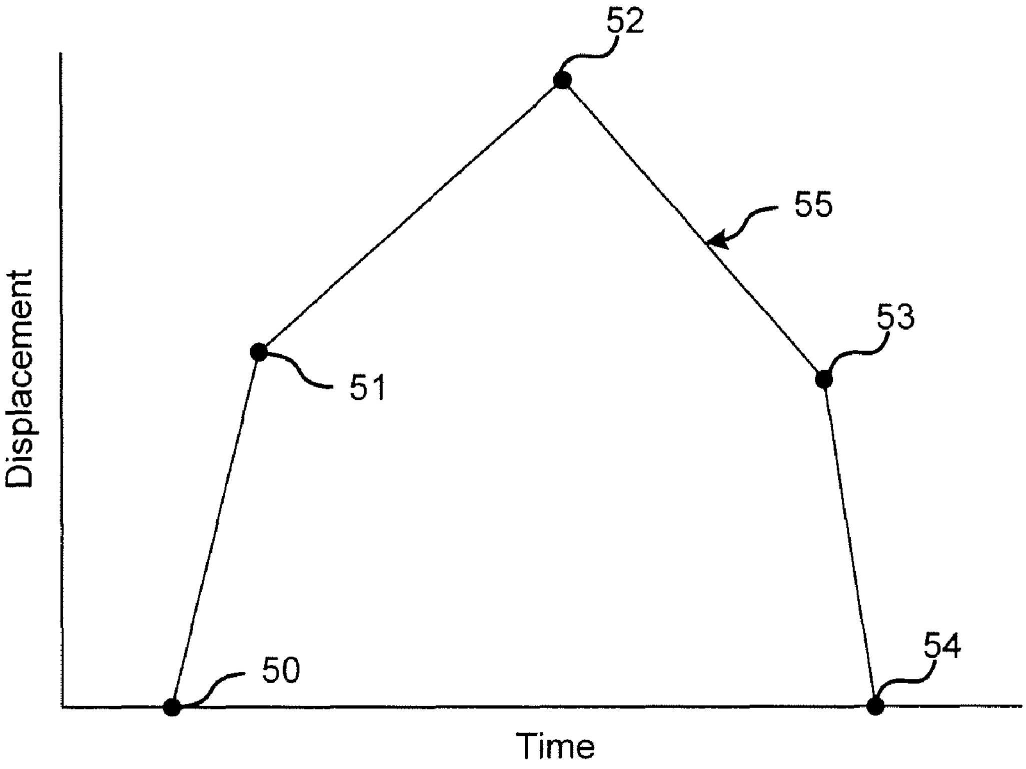
Fig. 1 PRIOR ART
FIG. 1 (prior art) is an illustration of an injector pin profile at a point of an engine operating plane.
Figure 2:
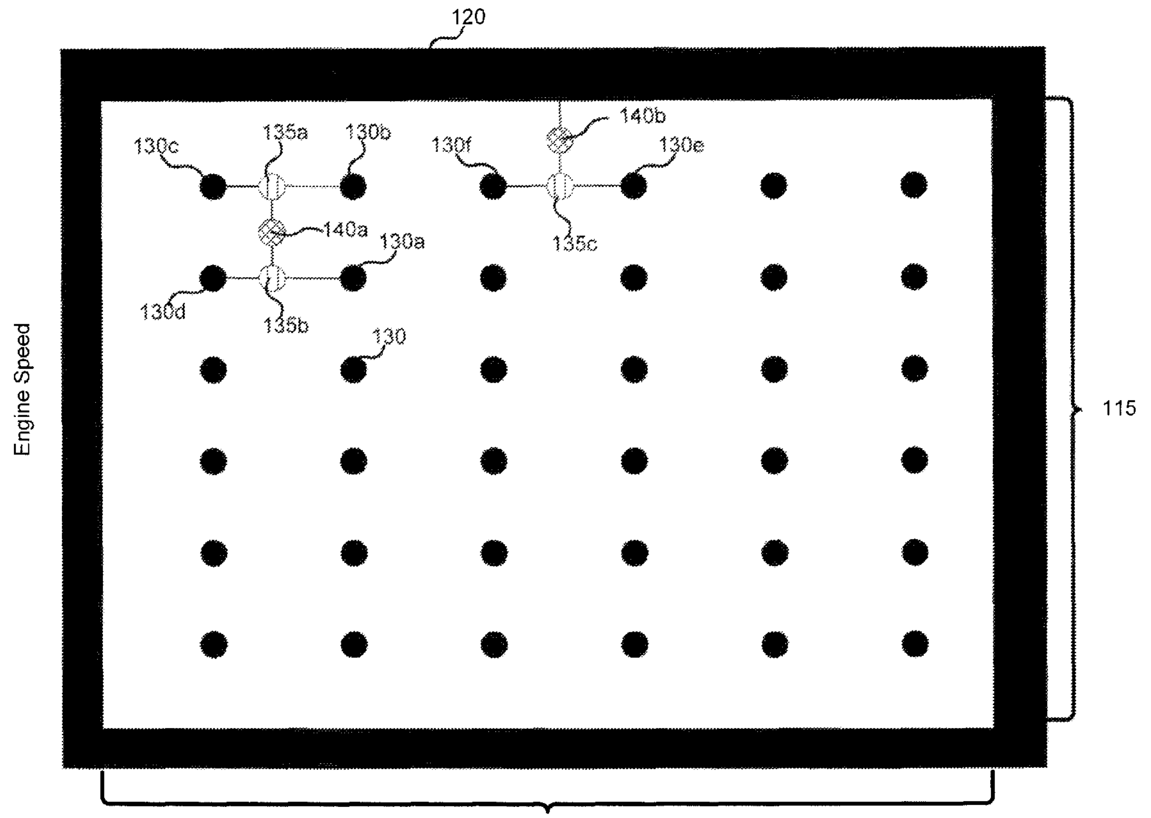
FIG. 2 is a graphic representation of an engine operating plane.

FIG. 2 is a graphic representation of an engine operating plane. The operating plane comprises a plane spanned by an operating range of engine torque values 110 and an operating range of engine speed values 115. According to various embodiments of the present invention, methods for determining an injector pin profile at an engine operating point may comprise determining the injector pin profile by interpolating between predetermined injector pin profiles. Experimentally derived injector pin profiles at a plurality of predetermined operating points 130 and one or more predefined boundary conditions in the boundary region 120 may be used during the interpolation procedure. For example, if an engine is required to operate at operating point 140*a*, the engine control unit (ECU) may use a predefined look up table to determine that points 130*a*, 130*b*, 130*c*, and 130*d* immediately surrounding operating point 140*a* and having associated predetermined injector pin profiles. Interpolating along contours of constant speed, the ECU then determines two additional injector pin profiles at operating points 135*a* and 135*b* having the same torque value as operating point 140*a*. Then, interpolating along a contour of constant torque, the ECU determines the injector pin profile for operating point 140*a*.

In some instances, the engine may operate at a point outside of the operating points having experimentally determined profiles. Such a case is illustrated as operating point 140*b*. In such instances, some embodiments utilize a default boundary condition in at least a portion of border region 120 as a predetermined injector profile for a step of the interpolation procedure. For example, to determine the injector pin profile for operating point 140*b*, the ECU first interpolates between experimentally derived points 130*f* and 130*e* to determine an injection profile at operating point 135*c*. The ECU determines the profile at point 140*b* using the previously determined injection profile at point 135*c* and a predetermined border injection profile, such as a zero lift profile comprising a number of displacements/time pairs, where each displacement is zero.

Figure 3:
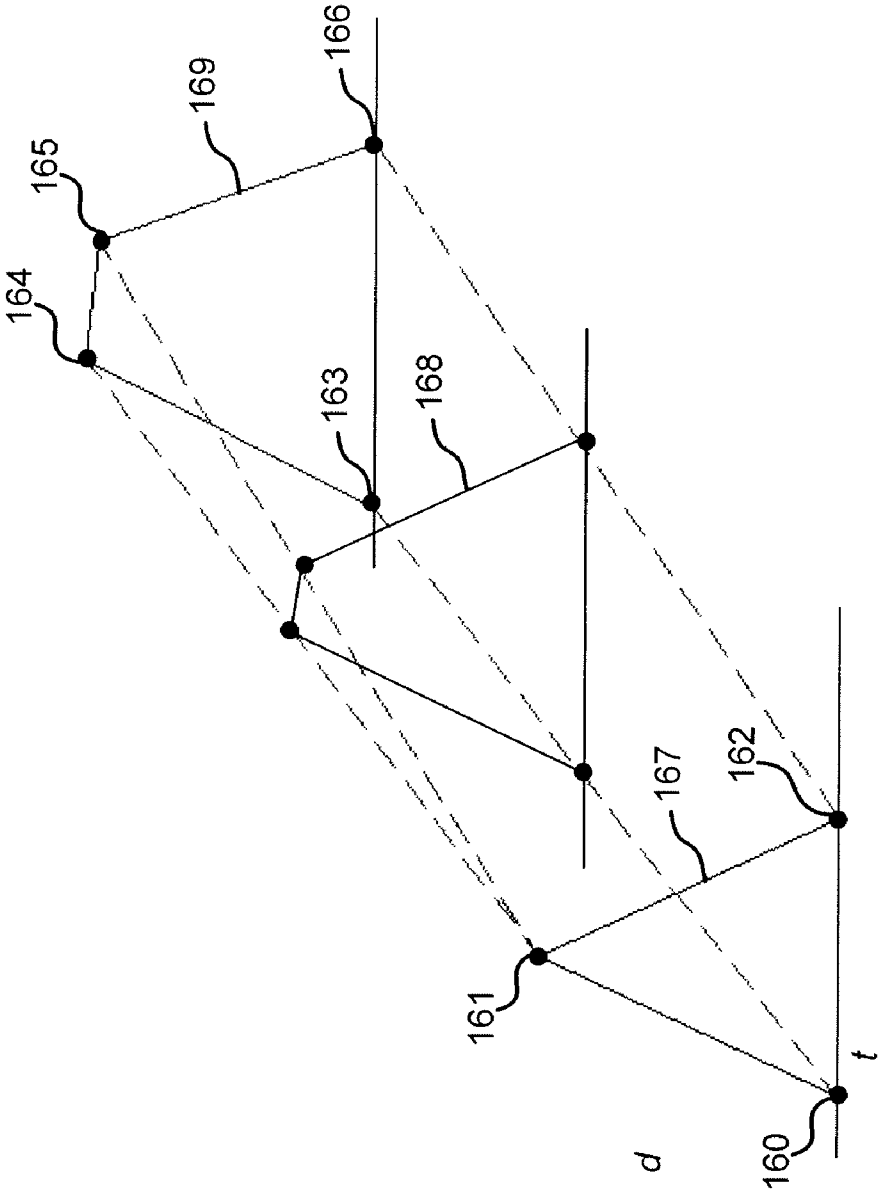
FIG. 3 is a graphic representation of an interpolation procedure according to an embodiment of the invention.

FIG. 3 is a graphical representation of an interpolation procedure according to an embodiment of the invention. A computing device that is performing the interpolation procedure, such as an ECU, is presented with two injector profiles at two distinct points in the operating plane, 167, and 169. The operating points will typically be located on the same contour of a constant dimension of the operating plane. For example, the two operating points may have the same engine speed values and vary only in their engine torque values, or vice versa. In this embodiment, points in the provided injection pin profiles 169 and 167 are connected to allow interpolation of an injection profile 168 at an operating point between the operating points associated with profiles 169 and 167.

The illustrated interpolation procedure proceeds in an ordered fashion across provided injector profiles 167 and 169. According to an algorithm used in some embodiments of the invention, the internal representation of the injection pin profiles are modified such that each of the two provided profiles has the same number of points. For example, in FIG. 3 the profile 167 has three points while profile 169 has four points; accordingly, one point is added to profile 167. Various embodiments may employ different rules for adding points to profiles, based on for example, the number of points for each profile, the location of the points on each profile, or the location of each profile in the operating plane. By way of example, in a situation where one profile has three points while the other profile has more than three points, the peak point of the first profile is duplicated until each profile has the same number of points. In the illustrated interpolation, after point 161 is duplicated, profile 167 may be represented as the set of points {160, 161, 161, 162} and profile 169 remains the set of points {163, 164, 165, 166}. Once both profiles have an equal number of points, the connection proceeds using the first point of the first set and the first point of the second set, and so on. As illustrated, this results in two connection lines originating from point 161, a first line between point 161 and point 164, and a second line between point 161 and point 165. An interpolated injection pin profile 168 can then be determined at any operating point between the operating points of profile 167 and profile 169. In some cases, the interpolated injection pin profile 168 can serve as the injection pin profile used during engine operation, or in other cases, the interpolated injection pin profile 168 can serve as one of two further injection pin profiles provided to the ECU for interpolation in the other operating plane dimension.

Figure 4:
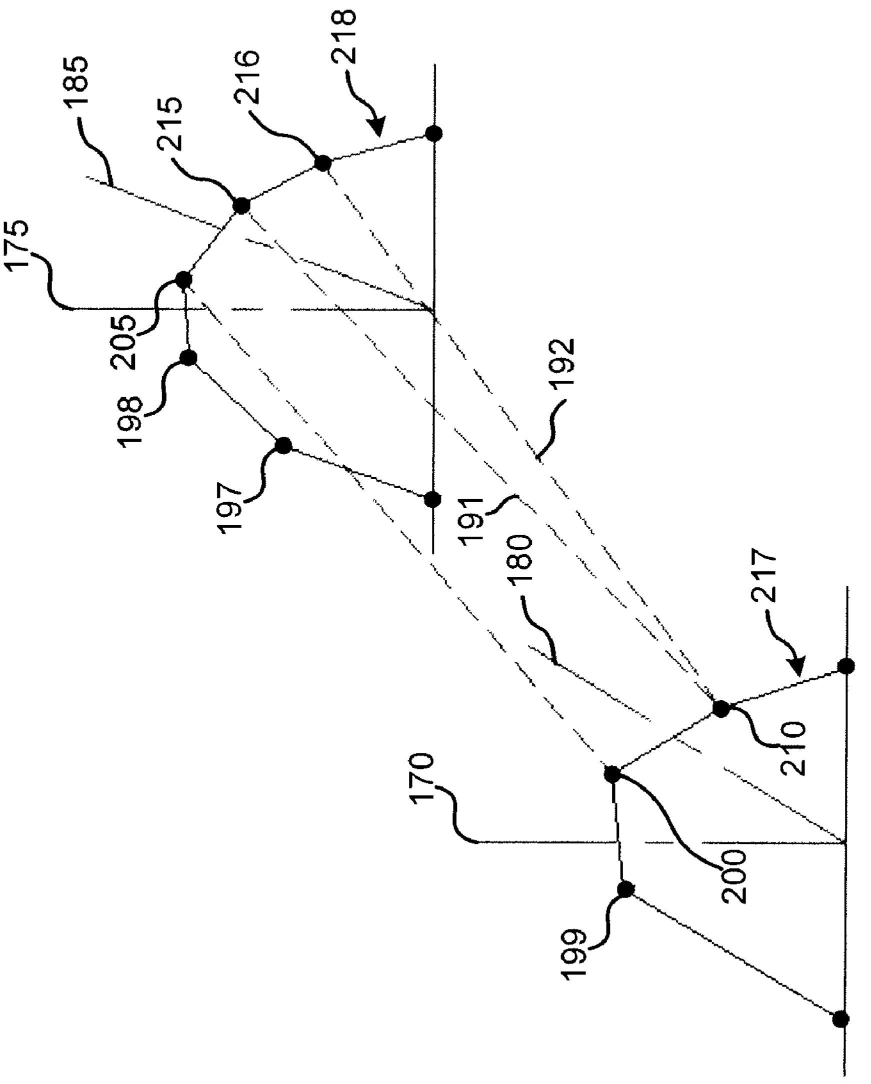
FIG. 4 is a graphic representation of a method of determining corresponding subsets of points between injector pin profiles according to an embodiment of the invention.

FIG. 4 is a graphic representation of a method of determining corresponding subsets of points between injector pin profiles according to an embodiment of the invention. In this embodiment, a corresponding subset of points of the larger profile 218 is determined for each point in the smaller profile 217. The corresponding subsets are determined using a divide and conquer algorithm executed recursively on the smaller pin profile.

The set of nonzero points in the smaller profile 217 {199, 200, 210} is divided 170 into two distinct subsets including subset/point {199} and subset {200, 210}. Correspondingly, the set of nonzero points in the larger profile 218 {197, 198, 205, 215, 216} is divided into two subsets {197, 198} and {205, 215, 216}, corresponding to the subset/point {199} and subset {200, 210} of the smaller profile 217, respectively. This procedure proceeds recursively, where each subset having more than one point of the smaller profile 217 and its corresponding subset in the larger profile 218, are divided into two subsets. Accordingly, in the illustrated profiles, the corresponding subsets {200, 210} and {205, 215, 216} are each divided at 180 and 185, respectively. Afterwards, subset {200} corresponds with subset {205}, while subset {210} corresponds with subset {215, 216}. In these embodiments, when there are an odd number of points in a subset to be divided, the extra point is placed in the subset that is closer to the peak of the profile. However, other methods of partitioning the injector profile may be employed.

In the illustrated embodiment, once recursive division of the smaller profile results in a subset comprising a single point, connection proceeds between the single point and each of the elements of the corresponding subset. Similar to the case described with respect to FIG. 3, when the larger profile's corresponding subset has more than one point, connection lines are formed between each element of the corresponding subset and the single point. This is illustrated in FIG. 4 with respect to the subset comprising points {215, 216}, corresponding to the subset comprising point 210. In some embodiments, the connection 191 and 192 may occur independently between each point of the corresponding subset and the single point. In other embodiments, the single point may be duplicated to form a duplicate point set having a number of duplicated points equal to the number of elements of the corresponding subset. In these embodiments, each duplicated point is connected to one and only one element of the corresponding subset.

Figure 5:
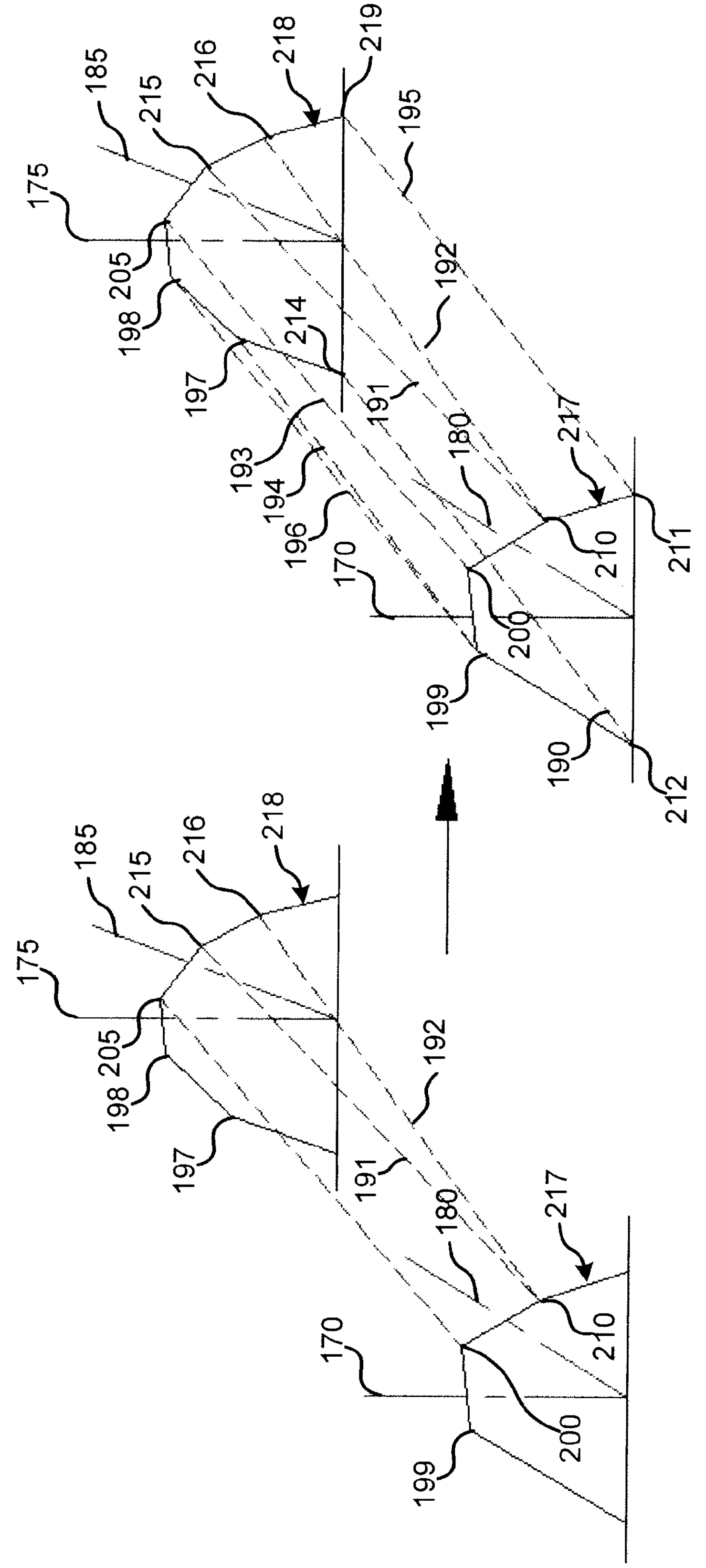
FIG. 5 illustrates the results of the interpolation procedure described with respect to FIG. 4.

FIG. 5 illustrates the final results of a connection procedure as described with respect to FIG. 4. After a corresponding subset of the larger profile 218 is determined for each point of the profile 217, the resultant connections are as follows: (1) connection 190 between {212} and {214}; (2) connection 196 between {199} and {197); (3) connection 194 between {199} and {198}; (4) connection 193 between {200} and {205}; (5) connection 191 between {210} and {215}; (6) connection 192 between {210} and {216}; and (7) connection 195 between {211} and {219}. Accordingly, after the profiles have been connected in this manner, an injection pin profile may be interpolated at any operating point between the operating points associated with the connected profiles 217 and 218.

Figure 6:
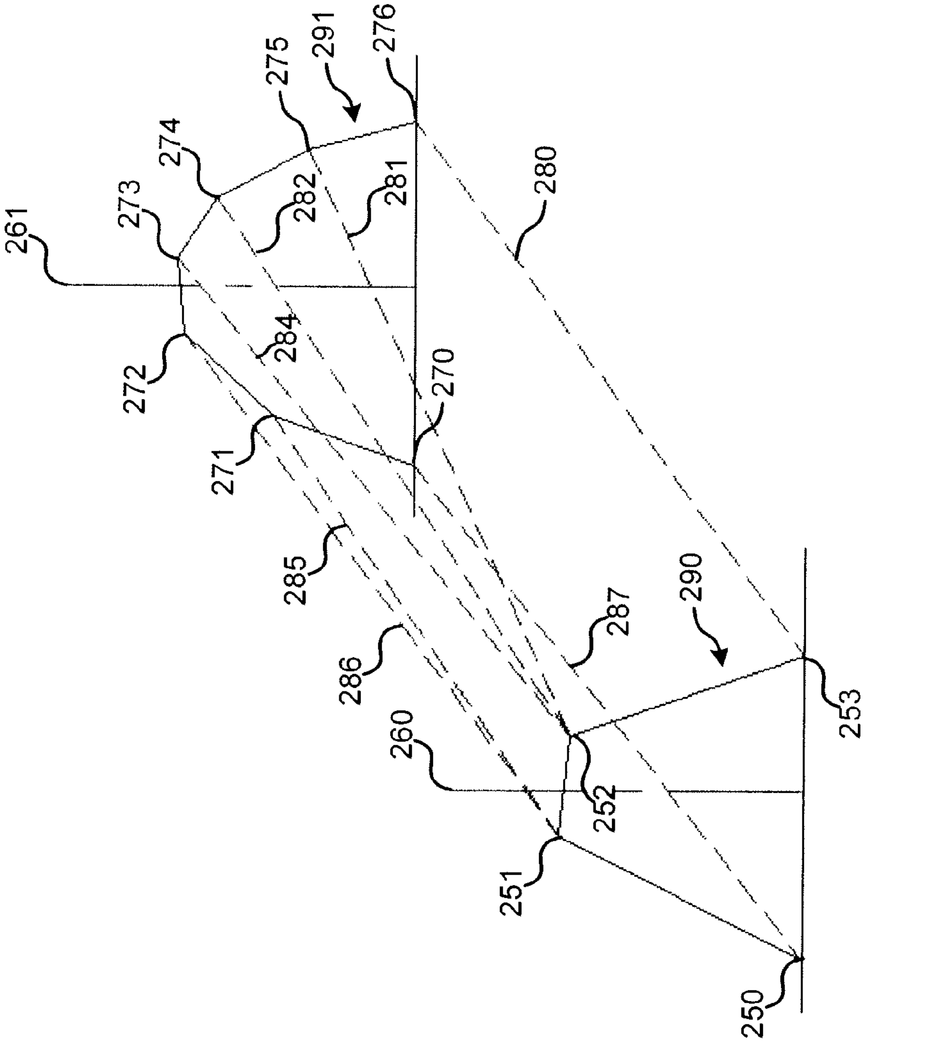
FIG. 6 illustrates an example of interpolation between two profiles according to an embodiment of the invention.

FIG. 6 illustrates an example of interpolation between two profiles according to an embodiment of the invention. In this example, after the starting points 250 and 270 and ending points 253 and 276 of the profiles 290 and 291 are matched, two points remain in the smaller profile 290, while five points remain in the larger profile 291. Accordingly, as described with respect to FIG. 4, the sets of points {251, 252} and {271, 272, 273, 274, 275} are each divided once, at 260 and 261, respectively. This results in the set {271, 272} corresponding to point 251 and the set, {273, 274, 275} corresponding to point 252. Accordingly, interpolation proceeds by first duplicating point 251 and tripling point 252 such that connection proceeds as follows: (1) connection 287 between {250} and {270}; (2) connection 286 between {251} and {271}; (3) connection 285 between {251} and {272}; (4) connection 284 between {252} and {273}; (5) connection 282 between {252} and {274}; (6) connection 281 between {252} and {275}; and (7) connection 280 between {253} and {276}. In this embodiment, after the profiles have been connected an interpolated injection profile may be determined at any point between the profiles.

Figure 7:
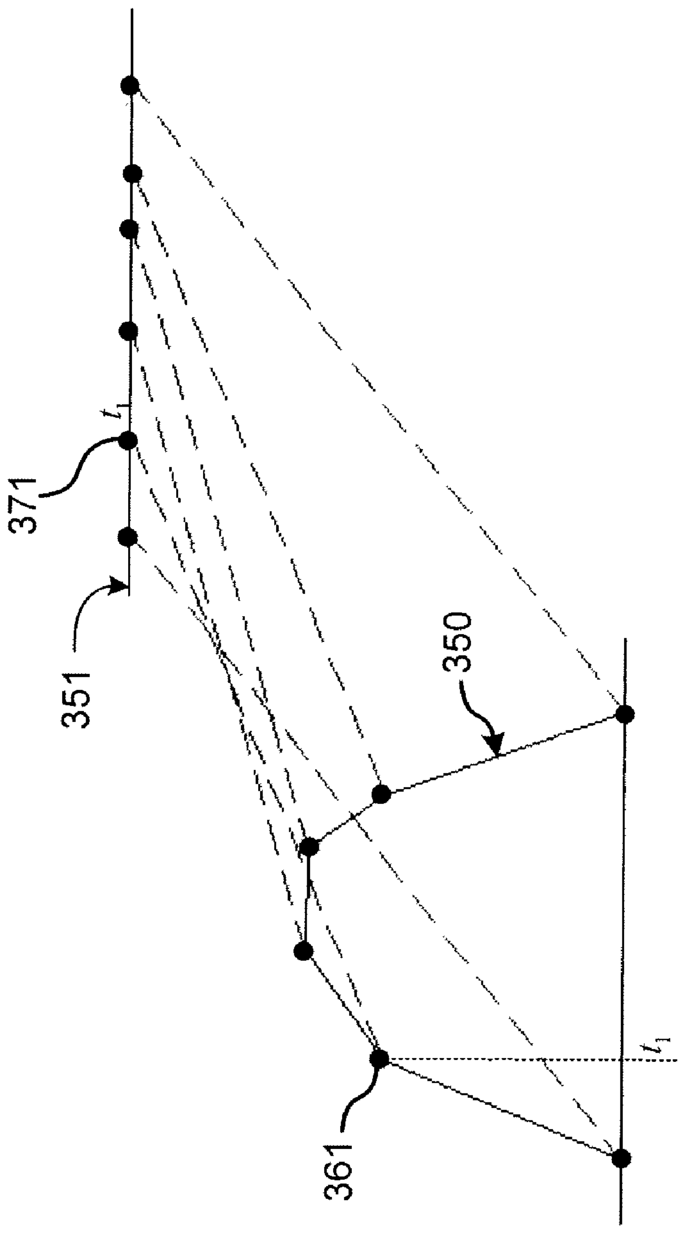
FIG. 7 illustrates an example of interpolation between an injector profile and a zero lift profile according to an embodiment of the invention.

FIG. 7 illustrates an example of interpolation between an injector profile and a zero lift profile according to an embodiment of the invention. In some embodiments, it may be necessary to determine an injection pin profile for an engine operating outside the part of the operating plane covered by the experimentally determined injection pin profile. In these cases, a predetermined injector pin profile may be used as a boundary condition when necessary. For example, a zero displacement injection pin profile 351 may be used as such a boundary condition. Determining an injection pin profile between a predetermined profile 350 and a boundary profile 351 may comprise determining an appropriate set of points, each with zero displacement, that corresponds to the predetermined injection pin profile 350. For example, for each point in the injection pin profile 350, a corresponding point having the same time value but a zero pin displacement is determined, e.g. point 361 and point 371 at time value $t_1$. An interpolated injection pin profile for operating points between the zero pin profile and the predetermined injection pin profile 350 may then be determined as described herein. In other embodiments, the placement of the points may be determined in other manners. For example, it may be desired to have sharper shaped injection pin profiles where the points of the zero displacement profile are placed closer to the center, or it may be desired to have broader shaped injection pin profiles where the points of the zero displacement profile are placed towards the ends.

Figure 8:
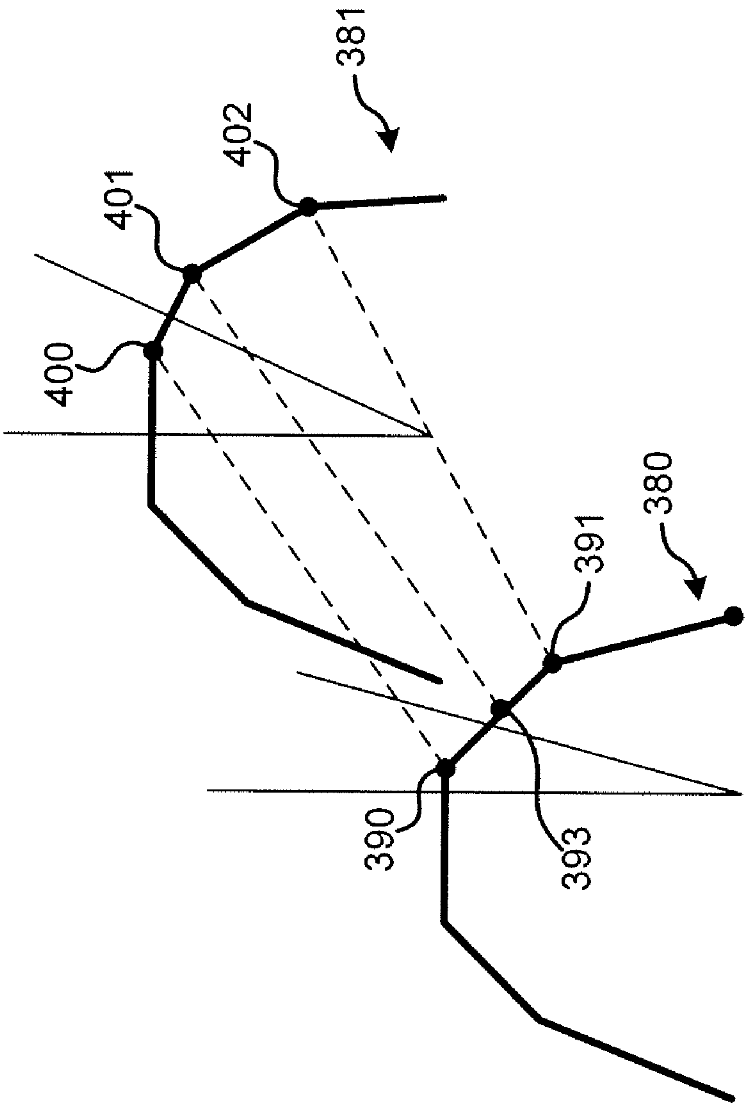
FIG. 8 is a graphic representation of an alternative method of point addition according to an embodiment of the invention.

FIG. 8 is a graphic representation of an alternative method of point addition according to an embodiment of the invention. In the illustrated embodiment, after recursive application of a divide and conquer application, the subset of the larger pin profile 381 corresponding to point 390 is {400} and the subset corresponding to point 391 is {401, 402}. In this embodiment, rather than duplicating point 391 in the smaller injection pin profile 380, an additional point 393 is added to the injection pin profile 380 between points 390 and 391. In such embodiments, the additional point may be added at a predetermined ratio of the length between the two points. For example if one point is to be added, it can be placed halfway along the line, and if two points are to be added, they can be placed at one third intervals along the line. In other embodiments, different methods of determining point placement may be used. For example, additional points may be placed at the same time value as the corresponding points of the larger profile. In FIG. 8, this would result in point 393 having a time value halfway between point 390 and point 391.

Figure 9:
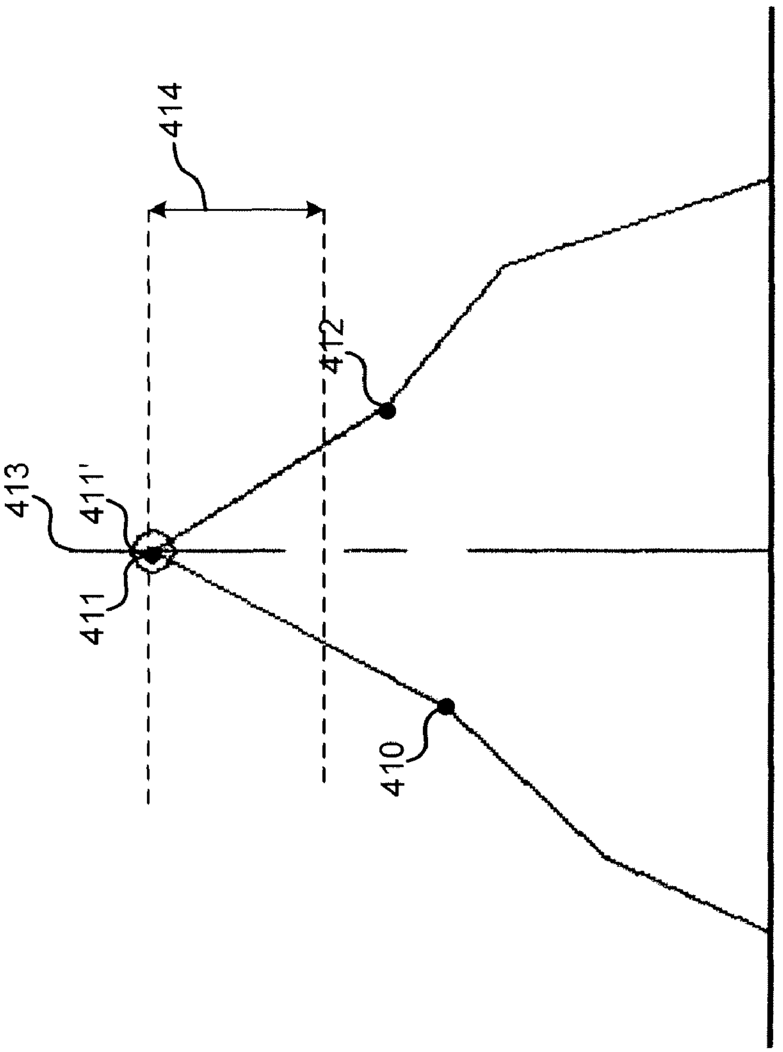
FIG. 9 is a graphic representation of a method for evaluating the characteristics of an injection pin profile according to an embodiment of the invention.
Figure 10:
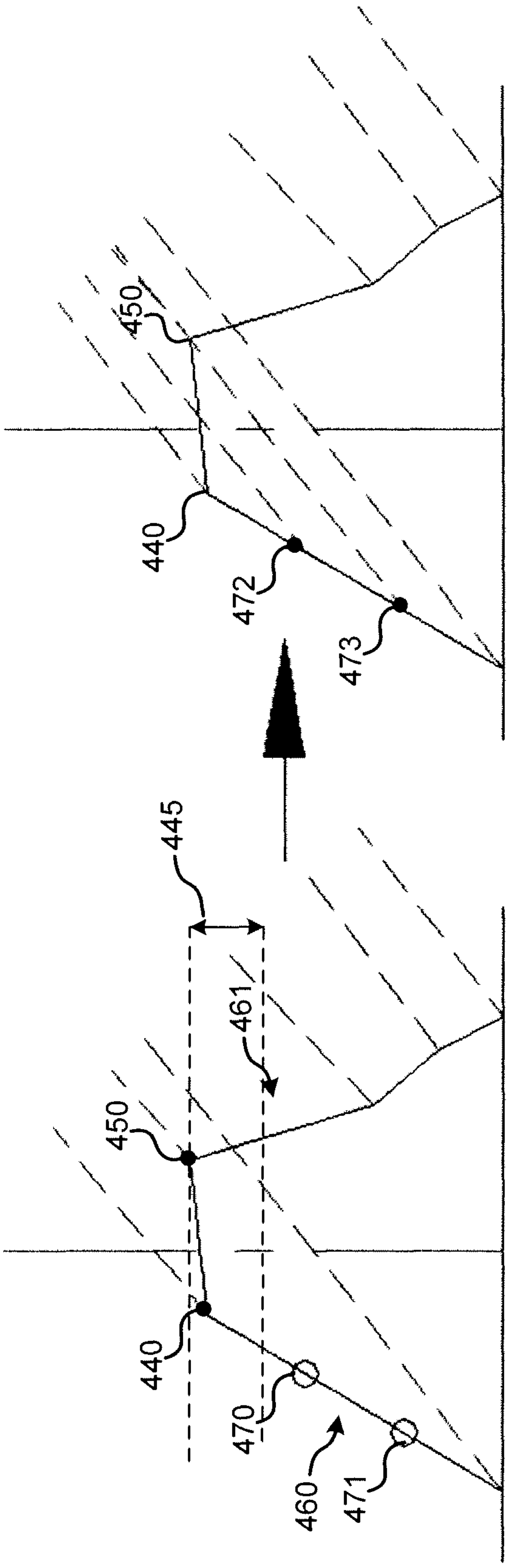
FIG. 10 illustrates an alternative result of the method described with respect to FIG. 9 and further illustrates a method of injection pin profile point determination according to the results of the method.

FIGS. 9 and 10 illustrate methods of dividing injection pin profiles according to some embodiments of the invention. In these embodiments, before dividing the profile to determine where additional points will be added, the profile is inspected to determine its peak characteristics. This may be accomplished by determining the profile point having the maximal displacement value, and the displacement values of the points surrounding this point. For example, in the profile illustrated in FIG. 9, point 411 has the maximal displacement value and points 410 and 412 surround it. In one embodiment, different profiles are classified as sharp peak profiles and broad peak profiles according to these displacement values. A sharp peak profile is one in which the displacement amplitude of the nearest neighboring points of the maximal point differs from the maximal point by a predetermined amount. For example, this predetermined amount may be a certain percentage or may be a certain displacement length. FIG. 9 illustrates a sharp peak, where the nearest neighboring point 412 of the maximal point 411 is outside the predetermined displacement length 414. When the profiles used to derive an interpolated injection pin profile contain sharp peaks, superior fidelity in the interpolated profile may be achieved by dividing the sharp peak profile at the location of the sharp peak. In an embodiment employing a divide and conquer algorithm, as described herein, this may be achieved by adding a duplicate point to the sharp peak profile at the location of the maximal point. For example in FIG. 9, a second point 411' may be added to the injection pin profile. The addition of such a duplicate point allows the profile to be divided 413 at the location of the maximal point such that each portion of the divided injection pin profile has a copy of the maximal point for use in interpolation. This results in the interpolated profiles retaining some of the sharp peak characteristics of the source profile. As described herein, after this initial step of analyzing the profile and duplicating a sharp peak point, the algorithm proceeds to add points to the profile according to the number of corresponding points in the other profile used for interpolation.

FIG. 10 illustrates a point addition procedure in the case of a broad peak profile according to this embodiment. In this case, the neighboring point 440 is within the predetermined threshold distance 445 of the maximal point 450. Accordingly, this injection pin profile is classified as a broad peak profile. In some instances, superior fidelity in interpolated profiles may be accomplished by dividing a broad peak such that each divided portion retains one of the points making up the peak. In one embodiment, the ECU may add points to the injection pin profile on the side having the fewer number of points such that the divide and conquer algorithm divides the profile between the points making up the peak. For example, in FIG. 10 side 460 has fewer points than side 461. Accordingly, two points 472 and 473 may be added to the profile as illustrated such that the resulting profile has an equal number of points on each side, so that division results in equal numbers of points in each divided portion. In some embodiments, the locations 470 and 471 of the points to be added may be equally spaced on the lines to which they are added, as described herein. For example, in FIG. 10 locations 470 and 471 divided the line between point 440 and the beginning of the profile into equal thirds.

In addition to determining a plurality of pin displacement and timing pairs that make up an interpolated injection pin profile, some embodiments determine other characteristics associated with an injection pin profile. For example, an injection pin firing delay may also be associated with the points of the operating plane having predetermined injector pin profiles. In these embodiments, during the determination of the injection pin profiles for the experimentally derived points 130 of FIG. 2, firing delays may also be determined for each of the points. These firing delays may be determined to appropriately time the beginning of injection pin displacement at the various points of the operating plane. This allows a firing delay time for an engine operating point be determined through interpolation along with the interpolation of the injection profile for operating point. For example, in the interpolation procedure described with respect to the point 140*a*, an interpolated firing delay may be determined for the profiles at points 135*a* and 135*b*. Then, along with the determination of the injection pin profile at point 140*a*, a firing delay for point 104*a* may be determined from the derived firing delays for points 135*a* and 135*b*.

Figure 12:
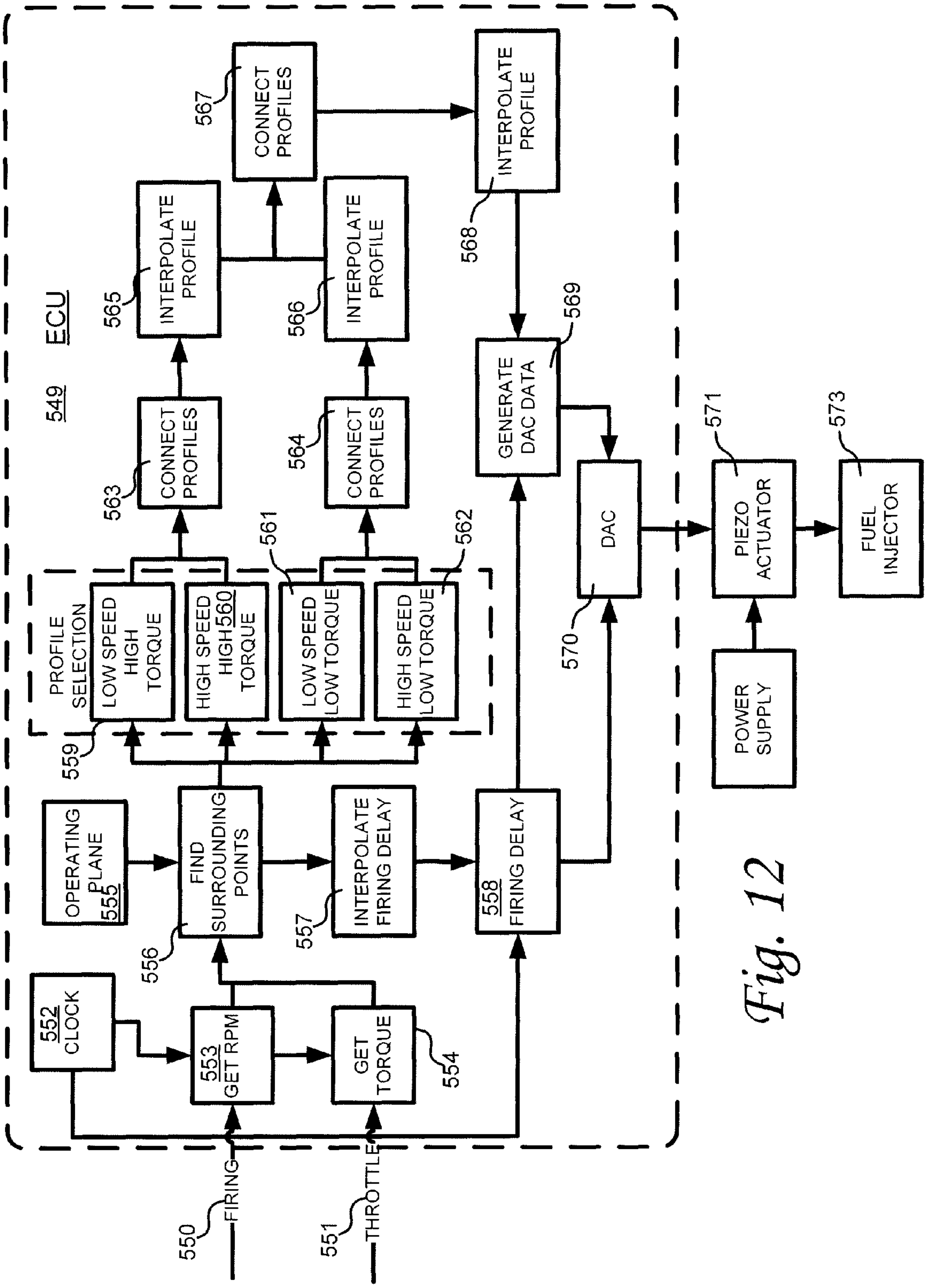
FIG. 12 illustrates a method of operation for an engine control unit according to an embodiment of the invention.

FIG. 12 illustrates a method of ECU operation according to an embodiment of the invention. In this embodiment, ECU 549 is configured to generate a fuel injection control signal using two input control signals. The first input control signal is a firing signal 550 produced by a top dead center detector disposed in the engine. The top dead center detector generates firing signal 550 when an engine piston reaches top dead center in the cylinder. The second input control signal is a throttle valve signal 551 that is generated from the accelerator pedal position. Firing signal 550 is used by the ECU 549 along with a clock signal provided by clock 552 to determine the operating engine speed 553. ECU 549 then determines the operating engine torque 554 using engine speed 553 and throttle signal 551. Next, ECU 549 uses a map 555 of the operating plane to determine the points 556 surrounding operating torque 554 and speed 553. In this embodiment, surrounding points 556 may comprise points on the engine operating plane 555 having higher and lower torque values than operating torque 554 and higher and lower engine speeds than operating speed 553. As described herein, surrounding points 556 may have predetermined injection profiles associated therewith.

In the illustrated embodiment, after determining surrounding points 556, ECU 549 uses the surrounding points 556 to determine an interpolated firing delay 557 and an interpolated injection profile 568. As described herein, determining interpolated injection profile 568 comprises obtaining the predetermined injection profiles at surrounding points 556. This comprises (1) obtaining the predetermined injection profile 559 associated with an operating point having a lower speed value and a higher torque value than the current operating point; (2) obtaining the predetermined injection profile 560 associated with an operating point having a higher speed value and a higher torque value than the current operating point; (3) obtaining the predetermined injection profile 561 associated with an operating point having a lower speed value and a lower torque value than the current operating point; and (4) obtaining the predetermined injection profile 562 associated with an operating point having a higher speed value and a lower torque value than the current operating point.

In this embodiment, a second step of determining an interpolated injection pin profile 568 comprises connecting the predetermined injection pin profiles to allow intermediate injection pin profiles 565 and 566 to be interpolated. In the illustrated embodiment, intermediate connection 563 and 564 proceeds along the speed axis of the operating plane. Accordingly, predetermined injection pin profiles 559 and 560 are connected 563 and predetermined injection pin profiles 561 and 562 are connected 564. As described herein, the steps of connecting the profiles 563 and 564 may proceed by way of a divide and conquer algorithm that may preferentially connect the peaks or peak areas of the predetermined profiles. After the predetermined profiles are connected, intermediate profiles 565 and 566 are interpolated at the speed values corresponding to operating speed 553. Thus, an interpolated profile 565 is determined for an operating point having a higher torque value than operating torque value 554 but having the same speed value as operating speed 553; and a second interpolated profile 566 is determined for an operating point having a lower torque value than operating torque value 554 but having the same speed value as operating speed 553.

In this embodiment, a third step of determining final injection profile 568 comprises connecting 567 intermediate profiles 565 and 566. In some embodiments, connection step 567 proceeds substantially similar to connection steps 563 and 564, for example through the use of a divide and conquer algorithm described herein. The connection of intermediate profiles 565 and 566 allows interpolation to proceed in the torque direction of the operating plane. Accordingly, the final injection pin profile 568 is interpolated for the current operating point comprising operating engine speed 553 and torque value 554.

As described herein, interpolating 557 the firing delay may comprise obtaining predetermined firing delays for the surrounding points 556 and performing a two-step interpolation procedure. For example, the two-step interpolation procedure may proceed as follows: first, the firing delays having the same torque values are connected, for example as described with respect to connection steps 563 and 564; and second, the determined intermediate firing delays are connected to determine an interpolated firing delay 558 at the engine operating point comprising speed value 553 and torque value 554. The actual determined firing delay 558 may be determined using the clock signal from clock 552 and the results of the interpolation procedure 557.

After determining an appropriate firing delay 558 and injection profile 560, the ECU 549 uses this information to obtain data 569 for use by a digital to analog converter 570 in generating an analog signal to drive a piezoelectric actuator 571. In this embodiment, firing delay 558 may be used to generate data 569 that takes into account the physical characteristics of the piezoelectric actuator 571 and fuel injector 573 to generate an appropriate digital signal from the interpolated profile 568. Additionally, firing delay 558 may also be used by the digital to analog converter 570 for timing the analog signal. In this embodiment, the digital to analog converter 570 provides the analog piezoelectric driving signal to the piezoelectric actuator 571 to cause an injector pin disposed in fuel injector 573 to be displaced according to the determined to interpolated profile 568.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations. When used to describe injector pin profiles, the terms “smaller” and “larger” refer to having fewer points than another injector pin profile and having more points than another injector pin profile, respectively.

Additionally, the various embodiments set forth herein are described in teens of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for determining an interpolated injector pin profile for a fuel injector at an engine operating point in an engine operating plane, the engine operating plane comprising operating points having speed values and torque values, the method comprising:

- obtaining a first injector pin profile associated with a first operating point and comprising a first set of profile points comprising displacement values and time values;
- obtaining a second injector pin profile associated with a second operating point and comprising a second set of profile points, the second injector pin profile comprising at least as many profile points as the first injector pin profile;
- connecting a profile point of the second injector pin profile with a profile point of the first injector pin profile to form connected injector pin profiles; and
- using the connected injector profiles to determine an interpolated injector pin profile at an operating point between the first operating point and the second operating point.

2. The method of claim 1, further comprising adding profile points to the first injector pin profile such that the first injector pin profile and the second injector pin profile comprise an equal number of points; and wherein the step of forming the connected injector pin profiles comprises connecting the profile points of the first injector pin profile with the profile points of the second injector pin profile according to increasing time value.

3. The method of claim 2, wherein the step of adding profile points to the first injector pin profile comprises:

- recursively implementing a divide and conquer algorithm to determine subsets of points of the second injector pin profile corresponding to each point of the first injector pin profile; and
- duplicating points of the first injector pin profile corresponding to subsets having more than one point.

4. The method of claim 2, wherein the step of connecting the profiles further comprises: connecting a sharp peak point of the first injector pin profile with a sharp peak point of the second injector pin profile; duplicating a sharp peak point of the first injector pin profile and connecting the sharp peak point and the duplicated sharp peak point of the first pin profile with broad peak points of the second injector pin profile; or connecting broad peak points of the first injector pin profile with broad peak points of the second injector pin profile.

5. The method of claim 4, wherein the step of adding profile points comprises adding profile points to the injection pin profile at predetermined intervals between a pair of consecutive injector pin profile points.

6. The method of claim 2, wherein the first injector pin profile is an interpolated injector pin profile determined from third and fourth injector pin profiles and the second injector pin profile is an interpolated injector pin profile determined from fifth and sixth injector pin profiles or the second injector pin profile is a predetermined boundary pin profile.

7. The method of claim 6, wherein the third, fourth, fifth, and sixth predetermined injector pin profiles are elements of a set of predetermined injector pin profiles corresponding to a set of predetermined points that span an engine operating plane, and wherein the third, fourth, fifth, and sixth predetermined injector pin profiles are chosen as the injector pin profiles corresponding to predetermined points of the operating plane immediately surrounding the engine operating point.

8. An engine control unit configured to determine an interpolated injector pin profile for a fuel injector at an engine operating point in an engine operating plane, the engine operating plane comprising operating points having speed values and torque values, the engine control unit comprising a computer readable medium having computer executable program code embodied thereon, the computer executable program code configured to cause the engine control unit to perform the steps of:

- receiving a first injector pin profile associated with a first operating point and comprising a first set of profile points comprising displacement values and time values;
- receiving a second injector pin profile associated with a second operating point and comprising a second set of profile points, the second injector pin profile comprising at least as many profile points as the first injector pin profile;
- connecting a profile point of the second injector pin profile with a profile point of the first injector pin profile to form connected injector pin profiles; and
- using the connected injector profiles to determine an interpolated injector pin profile at an operating point between the first operating point and the second operating point.

9. The engine control unit of claim 8, wherein the computer executable program code is further configured to cause the engine control unit to perform the step of adding profile points to the first injector pin profile such that the first injector pin profile and the second injector pin profile comprise an equal number of points; and wherein the step of forming the connected injector pin profiles comprises connecting the profile points of the first injector pin profile with the profile points of the second injector pin profile according to increasing time value.

10. The engine control unit of claim 9, wherein the step of adding profile points to the first injector pin profile comprises:

- recursively implementing a divide and conquer algorithm to determine subsets of points of the second injector pin profile corresponding to each point of the first injector pin profile; and
- duplicating points of the first injector pin profile corresponding to subsets having more than one point.

11. The engine control unit of claim 9, wherein the step of connecting the profiles further comprises: connecting a sharp peak point of the first injector pin profile with a sharp peak point of the second injector pin profile; duplicating a sharp peak point of the first injector pin profile and connecting the sharp peak point and the duplicated sharp peak point of the first pin profile with broad peak points of the second injector pin profile; or connecting broad peak points of the first injector pin profile with broad peak points of the second injector pin profile.

12. The engine control unit of claim 11, wherein the step of adding profile points comprises adding profile points to the injection pin profile at predetermined intervals between a pair of consecutive injector pin profile points.

13. The engine control unit of claim 9, wherein the first injector pin profile is an interpolated injector pin profile determined from third and fourth injector pin profiles and the second injector pin profile is an interpolated injector pin profile determined from fifth and sixth injector pin profiles or the second injector pin profile is a predetermined boundary pin profile.

14. The engine control unit of claim 13, wherein the third, fourth, fifth, and sixth predetermined injector pin profiles are elements of a set of predetermined injector pin profiles corresponding to a set of predetermined points that span an engine operating plane, and wherein the third, fourth, fifth, and sixth predetermined injector pin profiles are chosen as the injector pin profiles corresponding to predetermined points of the operating plane immediately surrounding the engine operating point.

15. A fuel injection system comprising:

a fuel injector configured to inject fuel into an internal combustion engine and comprising a pin configured to be displaced using an actuator;

the actuator configured to displace the pin according to an actuator driving signal; and an engine control unit configured to generate the actuator driving signal according to an engine operating point in an engine operating plane, the engine operating plane comprising operating points having speed values and torque values;

wherein the engine control unit is configured to determine the engine operating point using a firing signal and a throttle position signal; and wherein the engine control unit is further configured to generate the actuator driving signal using an interpolated injector pin profile, the interpolated injector pin profile determined using the steps of:

obtaining a first injector pin profile associated with a first operating point and comprising a first set of profile points comprising displacement values and time values;

obtaining a second injector pin profile associated with a second operating point and comprising a second set of profile points, the second injector pin profile comprising at least as many profile points as the first injector pin profile;

connecting a profile point of the second injector pin profile with a profile point of the first injector pin profile to form connected injector pin profiles; and using the connected injector profiles to determine an interpolated injector pin profile at an operating point between the first operating point and the second operating point.

16. The system of claim 15, wherein the engine control unit is further configured to perform the step of adding profile points to the first injector pin profile such that the first injector pin profile and the second injector pin profile comprise an equal number of points; and wherein the step of forming the connected injector pin profiles comprises connecting the profile points of the first injector pin profile with the profile points of the second injector pin profile according to increasing time value.

17. The system of claim 16, wherein the step of adding profile points to the first injector pin profile comprises:

recursively implementing a divide and conquer algorithm to determine subsets of points of the second injector pin profile corresponding to each point of the first injector pin profile; and duplicating points of the first injector pin profile corresponding to subsets having more than one point.

18. The system of claim 16, wherein the step of connecting the profiles further comprises: connecting a sharp peak point of the first injector pin profile with a sharp peak point of the second injector pin profile; duplicating a sharp peak point of the first injector pin profile and connecting the sharp peak point and the duplicated sharp peak point of the first pin profile with broad peak points of the second injector pin profile; or connecting broad peak points of the first injector pin profile with broad peak points of the second injector pin profile.

19. The system of claim 18, wherein the step of adding profile points comprises adding profile points to the injection pin profile at predetermined intervals between a pair of consecutive injector pin profile points.

20. The system of claim 16:

wherein the first injector pin profile is an interpolated injector pin profile determined from third and fourth injector pin profiles and the second injector pin profile is an interpolated injector pin profile determined from fifth and sixth injector pin profiles or the second injector pin profile is a predetermined boundary pin profile; and wherein the third, fourth, fifth, and sixth predetermined injector pin profiles are elements of a set of predetermined injector pin profiles corresponding to a set of predetermined points that span an engine operating plane, and wherein the third, fourth, fifth, and sixth predetermined injector pin profiles are chosen as the injector pin profiles corresponding to predetermined points of the operating plane immediately surrounding the engine operating point.

* * * * *